United States Patent
Reinicke (10) Patent No.: US 7,481,415 B2
(45) Date of Patent: Jan. 27, 2009

(54) MULTI-FORCE ACTUATOR VALVE WITH MULTIPLE OPERATING MODES

(75) Inventor: Robert H. Reinicke, Mission Viejo, CA (US)

(73) Assignee: Stanford Mu Corporation, Harbor City, CA (US)

(*) Notice: Subject to any disclaimer, the term of this patent is extended or adjusted under 35 U.S.C. 154(b) by 239 days.

(21) Appl. No.: 11/482,252

(22) Filed: Jul. 7, 2006

(65) Prior Publication Data

US 2008/0006791 A1 Jan. 10, 2008

(51) Int. Cl.
*F16K 31/12* (2006.01)
(52) U.S. Cl. .................... 251/129.1; 251/65
(58) Field of Classification Search ............. 251/65, 251/129.09, 129.1, 129.15
See application file for complete search history.

(56) References Cited

U.S. PATENT DOCUMENTS

| 4,679,017 | A | * | 7/1987 | Mishler et al. | ............. 335/164 |
| 4,749,167 | A | * | 6/1988 | Gottschall | ................... 251/65 |
| 5,108,070 | A | * | 4/1992 | Tominaga | ................... 251/65 |
| 5,787,915 | A | * | 8/1998 | Byers et al. | ................... 137/1 |

* cited by examiner

*Primary Examiner*—John K Fristoe, Jr.
(74) *Attorney, Agent, or Firm*—Gene Scott; Patent Law & Venture Group

(57) ABSTRACT

A multi-force actuator valve invention including a radially polarized permanent magnet, a pair of associated electromagnetic coils, a movable magnetically operated armature member, a valve located to be actuated by movement of the armature member, and mechanical force exerting means located and positioned to exert a force on the movable magnetically operated armature member. The multi-force actuator valve invention has electrical current control input means for supplying and controlling electrical current to the electromagnetic coils for controlling the movable magnetically operated armature member. The electrical current control input means for supplying and controlling electrical current to the electromagnetic coils for controlling the movable magnetically operated armature member has a plurality of types of controls that allow the multi-force actuator valve invention to operate or function as a plurality of types of valves such as a latching valve or a modulating valve. The electrical current control input means also has switching means for switching between the plurality of types of controls for permitting the multi-force actuator valve invention to be switched from one type of valve to another. In the preferred embodiments the electrical current control input means includes an H-bridge circuit and a modulating circuit.

8 Claims, 4 Drawing Sheets

MULTI-FORCE ACTUATOR VALVE WITH MULTIPLE OPERATING MODES

CROSS-REFERENCE TO RELATED APPLICATIONS

This application claims priority of a prior filed and Provisional Patent Application having Ser. No. 60/696,183 and filing date Jul. 1, 2005, and which is incorporated herein by reference.

BACKGROUND OF THE INVENTION

Actuator valves are well known and have been in use for many years and have performed in a satisfactory manner. An example of such an actuator valve is set forth in U.S. Pat. No. 3,814,376. This patent describes a linear motion two position valve that utilizes both permanent and electromagnets to provide fast response and low power consumption with magnetic latching in both positions. This is accomplished by utilizing a linear motion armature that also serves as the movable valve member, providing a permanent magnet to latch the armature in either valve open or valve closed position, and using a pair of like wound solenoid coils for moving the armature from one position to the other. The coils are momentarily energized with current flowing in one direction to move the armature from a given one of the two positions to the other, and momentarily energized with current flowing in the opposite direction to move the armature in the opposite direction. The greater portion of the flux from the permanent magnet moves in one axial direction through the armature when the armature is in one of the two positions for latching the armature in that position and is switched in direction through the armature when the armature is in its other position for latching the armature in such other position. This valve exhibits an exceptionally high latch or holding force to movable mass ratio which provides superb anti-ratting tolerances during the high vibration and shock environments present in the launch of space launch rockets and the satellites launched into space by such rockets. Unfortunately, this valve and other similar valves have limitations.

The actuator valve disclosed in this patent has been manufactured and used and has been shown to operate very efficiently at pressures up to 500 psig, and has proven to be producible in miniature and micro sizes as light as 8 gram. However, there are numerous industrial and aerospace valve applications that require operating pressures of 5,000 psig and greater and large flow capacities. However the actuator valve disclosed in this patent becomes heavy and bulky when designed to operate at these higher pressures and flow capacities. Moreover, the coils require high electrical current and power. Large weight, size and power are detrimental in aircraft and especially in space flight applications, where weight, size and power must be kept to an absolute minimum. Another limitation of the actuator valve disclosed in this patent is that it can only be used in "latching valve" applications, e.g., where the valve remains in the last commanded position without electrical power.

There are many actuator valve applications where it is necessary for the valve to always return to the closed position in the event of electrical power loss, which is often called a "normally-closed" or "fail safe-closed" valve. There are even actuator valve applications where its necessary for the valve to always return to the open position when power is lost, which is called a "normally-open" valve.

There are still other valve applications where it is necessary to electrically modulate the valve to partially open positions to provide a controllable variable fluid flow throttling function. These low pressure, small flow capacity, and operating mode limitations associated with actuator valve disclosed in this patent and other similar actuator valves have been overcome with the present multi-force actuator valve invention. The present multi-force actuator valve invention overcomes the inability of the prior art actuator valves to effectively operate at high pressures and at high flow capacities as well as the weight and bulkiness and high electrical current and power problems associated with prior art actuator valves that attempt to handle high pressures and high flow capacities. The present multi-force actuator valve invention overcomes the inability of the prior art actuator valves to operate in other modes than the latching mode where the valve remains in the last commanded position without electrical power.

The multi-force actuator valve invention provides substantially improvements to prior art actuator valves and can effectively be used to operate a fluid control valve or other such valve. The multi-force actuator valve invention is a substantial improvement over prior art latching actuator valves and has increased energy utilization efficiency. With the present invention, mechanical energy stored in mechanical springs and the like is added to the electromagnetic actuation force to improve latch valve performance capability at higher operating pressures and flow rates, while achieving smaller valve size, lower weight and reduced power consumption. The present invention also enables the valve structure to operate in a plurality of modes including normally-closed, normally-open and modulating modes.

SUMMARY OF THE INVENTION

This invention relates to valves and more particularly to actuator valves that are operated by a plurality of forces including permanent magnet, electromagnetic and mechanical spring forces.

Accordingly, it is an object of the invention to provide a multi-force actuator valve that is operated by the combination of different types of forces.

It is an object of the invention to provide a multi-force actuator valve that provides increased performance over previous actuator valves.

It is an object of the present invention to provide a multi-force actuator valve that is capable of being used with high pressures.

It is an object of the present invention to provide a multi-force actuator valve that is capable of being used as a large size valve.

It is an object of the present invention to provide a multi-force actuator valve that is capable of handling large fluid flows.

It is an object of the present invention to provide a multi-force actuator valve that is small or compact in size.

It is an object of the present invention to provide a multi-force actuator valve that is low in weight.

It is an object of the present invention to provide a multi-force actuator valve that operates with low power consumption.

It is an object of the present invention to provide a multi-force actuator valve that has a variety of uses.

It is an object of the present invention to provide a multi-force actuator valve that is capable of being used in various valve modes.

It is an object of the present invention to provide a multi-force actuator valve that is capable of being used in a latching valve mode.

It is an object of the present invention to provide a multi-force actuator valve that is capable of being used in a normally-closed valve mode.

It is an object of the present invention to provide a multi-force actuator valve that is capable of being used in a normally-open valve mode.

It is an object of the present invention to provide a multi-force actuator valve that is capable of being used in a modulating valve mode.

It is an object of the present invention to provide a multi-force actuator valve that is capable of being used in a fail safe manner.

It is an object of the present invention to provide a multi-force actuator valve that uses stored mechanical energy.

It is an object of the present invention to provide a multi-force actuator valve that uses a mechanical force input in the valve operation.

It is an object of the present invention to provide a multi-force actuator valve that is particularly adapted for use where low weight, small size and low power consumption are needed.

It is an object of the present invention to provide a multi-force actuator valve that is particularly adapted for spacecraft applications.

It is an object of the present invention to provide a multi-force actuator valve that is particularly adapted for aircraft use.

It is an object of the present invention to provide a multi-force actuator valve that is very reliable.

It is an object of the present invention to provide a multi-force actuator valve that has few moving parts.

It is an object of the present invention to provide a multi-force actuator valve that is simple in its operation.

It is an object of the present invention to provide a multi-force actuator valve that requires little maintenance.

It is an object of the present invention to provide a multi-force actuator valve that is easy to test.

It is an object of the present invention to provide a multi-force actuator valve that is easy to service or repair.

It is an object of the invention to provide a multi-force actuator valve that is easy to manufacture.

It is an object of the invention to provide a multi-force actuator valve that is rugged and reliable.

These and other objects of the invention will become apparent from the following description of the multi-force actuator valve invention that comprises a radially polarized permanent magnet, a pair of associated electromagnetic coils, a movable magnetically operated armature member, a valve located to be actuated by movement of the armature member, and mechanical force exerting means located and positioned to exert a force on the movable magnetically operated armature member. The multi-force actuator valve invention has electrical current control input means for supplying and controlling electrical current to the electromagnetic coils for controlling the movable magnetically operated armature member. The electrical current control input means for supplying and controlling electrical current to the electromagnetic coils for controlling the movable magnetically operated armature member has a plurality of types of controls that allow the multi-force actuator valve invention to operate or function as a plurality of types of valves such as a latching valve or a modulating valve. The electrical current control input means also has switching means for switching between the plurality of types of controls for permitting the multi-force actuator valve invention to be switched from one type of valve to another. In the preferred embodiments the electrical current control input means includes an H-bridge circuit and a modulating circuit. In the preferred embodiments, the mechanical force exerting means comprises one or more helical springs that are located to exert their spring forces on the magnetically operated armature member.

BRIEF DESCRIPTION OF THE DRAWINGS

The invention will be hereinafter more completely described with reference to the accompanying drawings in which.

DETAILED DESCRIPTION OF THE PREFERRED EMBODIMENTS

The first embodiment of the multi-force actuator valve is illustrated in FIGS. 1 through 4 and is designated generally by the number 10. It should be understood that the terms left and right used in describing the multi-force activator valve 10 refer to the multi-force activator valve 10 as it is oriented and set forth in FIGS. 2 through 4. The multi-force actuator valve 10 has an actuator housing 12 that is connected to a hollow cylindrical valve housing 14. The actuator housing 12 has a hollow cylindrical main housing 16 and a hollow cylindrical mechanical force housing 18 that is connected to one end 20 of the main housing 16. A donut or toroidal shaped permanent type magnet 22 is centrally located within the main housing 16. In the preferred embodiment, this permanent magnet 22 is a rare earth type permanent magnet. As illustrated, this permanent magnet 22 is radially polarized with the north pole N being located on the outside of the magnet 22 and the south pole S located on the inside of the permanent magnet 22. Solenoid coils 24 and 26 are located immediately adjacent to each side of the permanent magnet 22 within the main housing 16. A cylindrically shaped armature 28 is located within the permanent magnet 22 and the associated solenoid coils 24 and 26 and this armature 28 is free to move back and forth axially within the permanent magnet 22 and within the associated solenoid coils 24 and 26.

A thin cylindrical connecting rod 30 is connected to one end 32 of the armature 28 and extends outward from the end 32 along the long axis X of the armature 28 and the outer end of the connecting rod 30 is connected to a disc shaped force exerting member 34. A helical compression spring 36 is located within the mechanical force housing 18 between one surface 38 of the force exerting member 34 and the adjacent inner wall surface 40 of the housing 18. Another substantially identical helical compression spring 42 is located within the housing 18 between the other surface 44 of the force exerting member 34 and the adjacent outer wall surface 46 of the main housing 16.

A thin cylindrical activating rod 48 is connected to the other end 50 of the armature 28 and extends outward from the end 50 of the armature 28 along the long axis X of the armature 28. The other end of this actuating rod 48 is connected to a valve closure member 52 that has a valve sealing surface portion 54 that is located, sized and shaped to contact a corresponding valve seat surface 56 that is located between an input port 58 and one outlet port 60 in the valve housing 14 to prevent fluid from flowing from the fluid inlet port 58 to the fluid outlet port 60 in the valve body 14 of the multi-force actuator valve 10 when the valve sealing surface portion 54 is in sealing contact with the valve seat surface 56. The valve seat surface 56 material is an elastomer or other mechanically compliant material that compresses slightly when sealing against the valve seating portion 54.

Figures 1, 2:
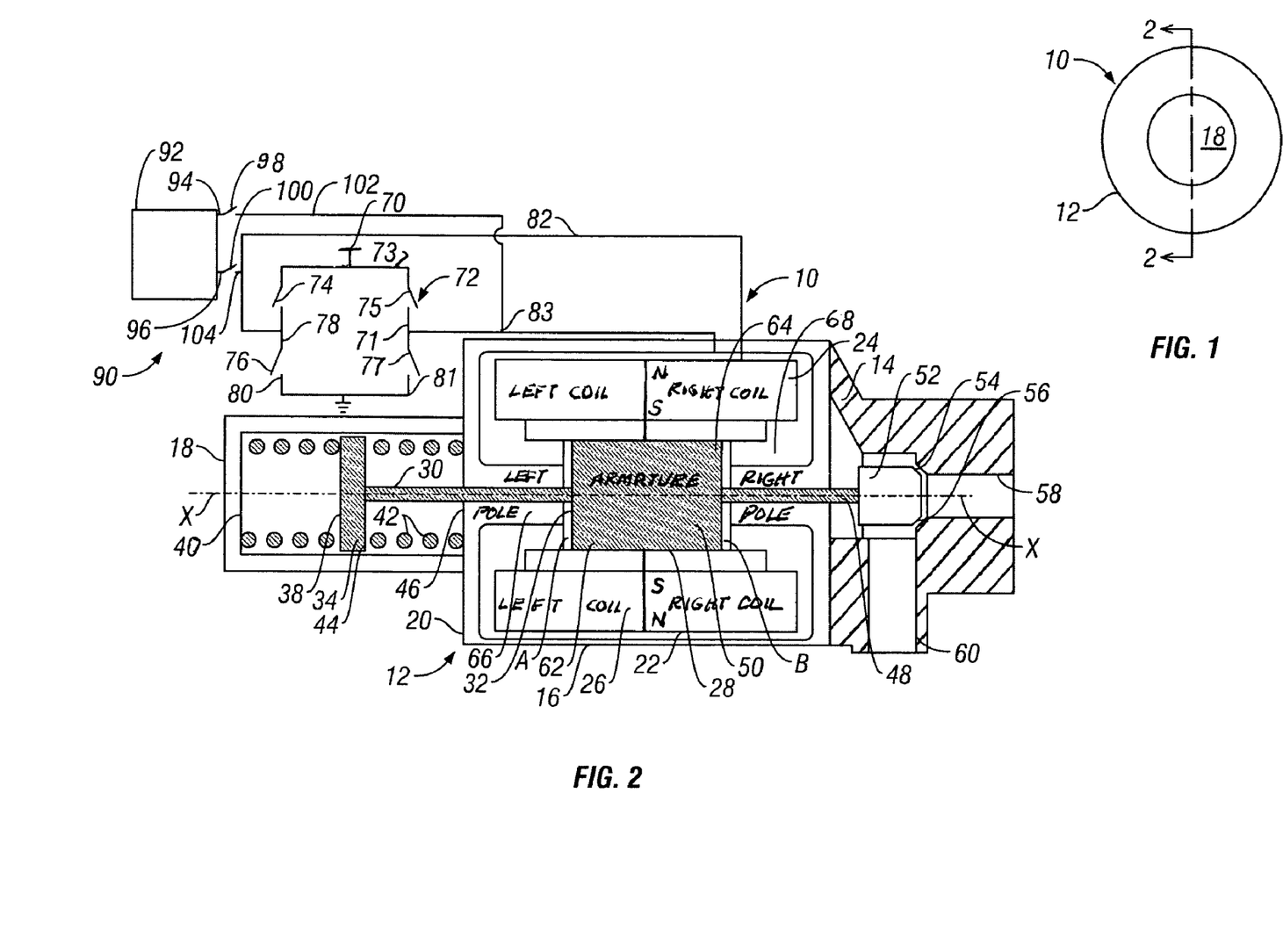
FIG. 1 is an end view of one embodiment of the multi-force actuator valve invention.
FIG. 2 is an enlarged sectional view of the embodiment of the multi-force actuator valve invention illustrated in FIG. 1 taken substantially on the line 2-2 thereof and also illustrating power sources and an electrical circuits used for valve operation.
Figure 3:
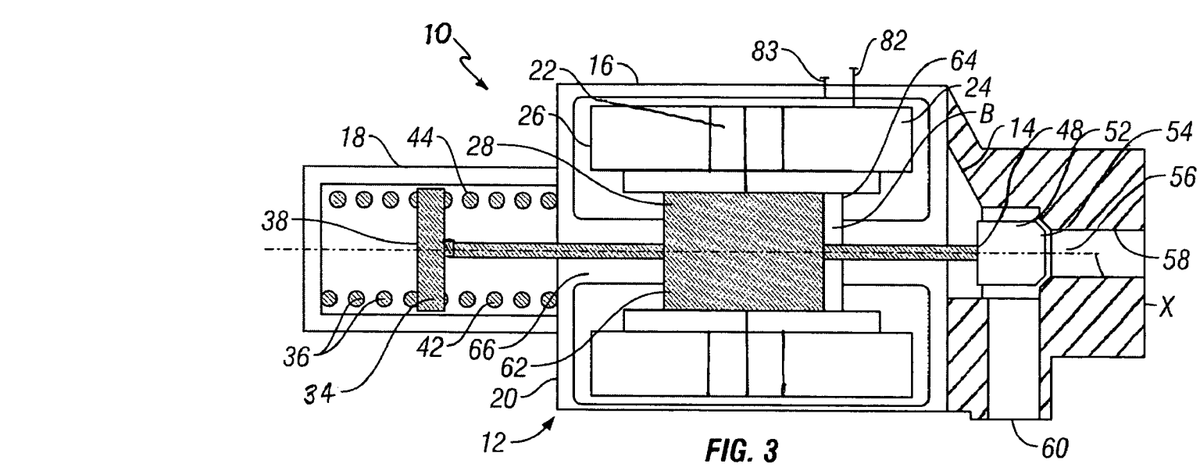
FIG. 3 is a sectional view of the embodiment of the multi-force actuator valve invention illustrated in FIGS. 1 and 2 in the valve open position.
Figure 4:
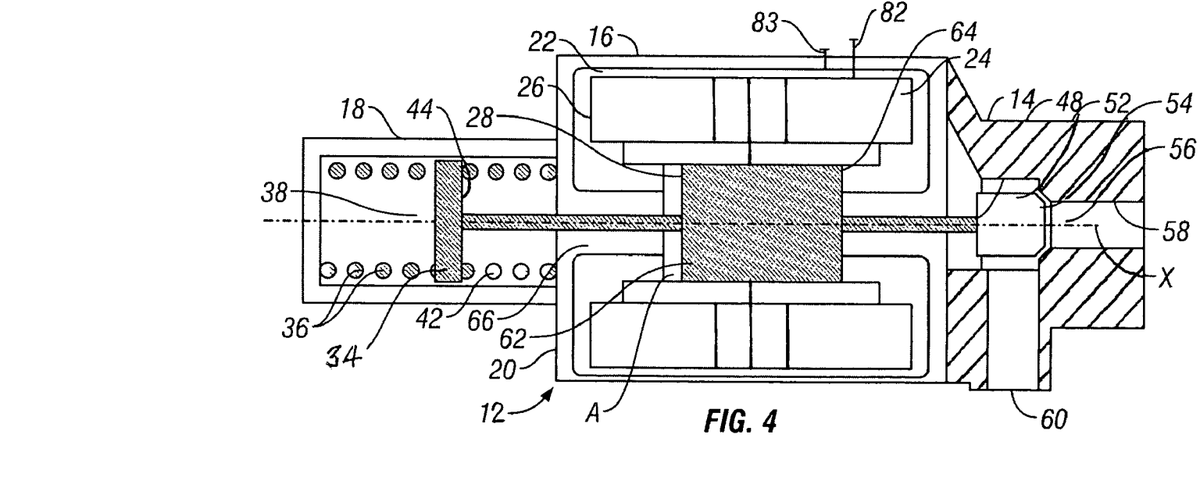
FIG. 4 is a sectional view of the embodiment of the multi-force actuator valve invention illustrated in FIG. 3 in the valve closed position

The armature 28 and the connected valve closure member 52 and the force exerting member 34 are illustrated in their neutral positions in FIG. 2. As illustrated in FIGS. 2 through 4, the armature 28 has a left pole 62 and a right pole 64. Lateral movement of the armature 28 is limited by a left pole contracting member 66 and a right pole contracting member 68 that are made from a magnetically attractive material. When the multi-force actuator valve 10 is not in use and the armature 28 is in its neutral centered position as illustrated in FIG. 2, the springs 36 and 42 hold the armature 28 in place as well as the connected valve closure member 52 in place and tend to prevent free axial movement of the armature 28 and the connected valve closure member 52 that could result in damage to the valve sealing surface portion 54 on the valve closure member 52 and or the valve seat surface 56. It should be noted that although springs 36 and 42 have been set forth for use with the preferred embodiments of the invention, other mechanical force exerting means such as belleville discs, flexures and the like can be used in place of the springs 36 and 42.

As the name implies, the multi-force activator valve 10 uses a combination of forces in its operation that act upon the armature 28. These forces are the force from the springs 36 and 42, the magnetic force from the donut shaped permanent magnet 22 and the forces from the electromagnetic solenoid coils 24 and 26. Consequently, the force on the armature 28 can be expressed as:

$$F_t = F_{mech} + F_{mag} + F_{emag}$$

where:

$F_t$ is the total force on the armature 28.

$F_{mech}$ is the force on the armature 28 from the springs 36 and 42 or other mechanical force exerting means.

$F_{mag}$ is the force on the armature 28 from the permanent magnet 22.

$F_{emag}$ is the force on the armature 28 from the solenoid coils 24 and 26.

As illustrated in FIG. 2, with the armature 28 centered within the permanent magnet 22, there are no forces on the armature 28 that tend to move the armature 28 in a lateral direction along the axis X. In this condition, there is an air gap A between the left pole end 62 of the armature 28 and the adjacently located left pole contacting member 66 and an equal air gap B between the right pole end 64 of the armature 28 and the adjacently located right pole contacting member 68. As a consequence, the net force exerted by the permanent magnet 22 on the armature 28 is zero. However, if the armature 28 is moved to the left as it is viewed in FIG. 3 to where the left pole 62 of the armature 28 contacts the left pole contacting member 66, a strong magnetic force is applied through the left pole contacting member 66 and the left pole 62 of the armature 28 that holds the left pole 62 of the armature 28 against the left pole contacting member 66. In order for the armature 28 to stay latched to the left pole contacting member 66, the net attracting magnetic force on the movable armature 28 must exceed the net separating force of the springs 36 and 42. This can be accomplished by using springs 36 and 42 that have a net spring rate that is less than the permanent magnet force rate. However, in order to move the armature 28 to this position, it was necessary to compress the coil spring 36 in view of the fact that the force exerting member 34 is located adjacent to the coil spring 36 and is also connected by the rod 30 to the end 32 of the armature 28 that is moved to the left. This compressed spring 36 has stored energy.

If the armature 28 had been moved to the right as illustrated in FIG. 4, rather than to the left as it is viewed in FIG. 3, to where the right pole 64 of the armature 28 contacts the right pole contacting member 68, a strong magnetic force is applied through the right pole contacting member 68 and the right pole 64 of the armature 28 that holds the right pole 64 of the armature 28 against the right pole contacting member 68. In order for the armature 28 to stay latched to the right pole contacting member 68, the net attracting magnetic force on the movable armature 28 must exceed the net separating force of the springs 36 and 42. This can be accomplished by using springs 36 and 42 that have a net spring rate that is less than the permanent magnet force rate. However, in that situation, in order to move the armature 28 to this right position, it was necessary to compress the coil spring 42 in view of the fact that the force exerting member 34 is located adjacent to the coil spring 42 and is also connected by the rod 30 to the end 32 of the armature 28 that is moved to the right. This compressed spring 42 has stored energy. It will be appreciated, that there is effectively no way to move the armature 28 to either of these left or right positions without energizing one of the solenoid coils 24 or 26 or both.

As illustrated in FIG. 2, a suitable electrical power source 70, that in the preferred embodiment would provide 28 volts of direct current, is provided to energize the solenoid coils 24 and 26 through an H-bridge circuit that is designated generally by the number 72. As indicated in the H-bridge circuit 72, this power source 70 is electrically connected to the lead 73 that is in turn connected to the electrical switches 74 and 75 that are respectively connected to the electrical switches 76 and 77 by the respective electrically conductive leads 78 and 79. The switches 76 and 77 are in turn connected to ground through the respective electrically conductive leads 80 and 81. In order to connect the H-bridge circuit 72 to the coils 24 and 26, electrically conductive leads 82 and 83 are provided that are electrically connected to the respective leads 78 and 79 and also to the coils 24 and 26 that are electrically connected in parallel in the preferred embodiment.

The H-bridge circuit 72 allows back and forth or left and right armature 28 control. To get the armature 28 to move in one direction, an opposing pair of switches are closed. For instance, in the H-bridge diagram 72 if the switches 74 and 77 are closed with the switches 75 and 76 open, electrical current flows through the coils 24 and 26 in one direction and as a result the armature 28 moves in one direction. If the switches 75 and 76 are closed with the switches 74 and 77 open, then electrical current flows through the coils 24 and 26 in the opposite direction and as a result the the armature 28 moves in the opposite direction.

FIG. 3 illustrates the multi-force actuator valve 10 with the valve in the open position with the armature 28 latched in the left position with its left pole 62 in contact with the left pole contacting member 66. In this position, the left pole 62 of the armature 28 is held or latched to the left contacting pole 66 by the magnetic force from the permanent magnet 22. This force from the permanent magnet 22 is opposed by the force from the compressed spring 36, but the force from the spring 36 is less than the force from the permanent magnet 22 so the pole 62 of the armature 28 remains in contact with the left pole contacting member 66.

As previously indicated, both solenoid coils 24 and 26 are electrically connected usually in parallel, although series connection is possible, to the previously described H-bridge switching circuit that is designated generally by the number 72. As known in the art, the wire windings of the coils 24 and 26 must carefully follow the "right hand rule" to establish the desired magnetic polarity. The following is a description of how two-wire reversing polarity coil energization "switches" the magnetic flux from one pole of the armature 28 to the other to actuate the multi-force actuator valve 10. The following describes what happens in the first milliseconds of energization of the coils 24 and 26 after the the multi-force actuator valve 10 is in the valve in the open position with the armature 28 latched in the left position with its left pole 62 in contact with the left pole contacting member 66 as previously described with respect to FIG. 3:

1. Both coils 24 and 26 are simultaneously energized with a step application of a DC voltage, typically 28 vdc in the preferred latching embodiment, from the power source 70 through the H-bridge switching circuit 72. Current to the coils 24 and 26 does not build up instantly due to the coils' inductance, but instead takes typically several milliseconds to reach a steady state value.

2. As current in the left coil 26 starts to increase, it begins to establish a magnetic polarity that tends to "buck" the magnetic polarity of the permanent magnet 22 (in a manner similar to incorrectly arranging two like batteries in series: connecting the two anodes together, and the two cathodes together, reducing the net voltage between anode and cathode to zero).

3. As the current in the right coil 24 starts to increase, it begins to establish a magnetic polarity that adds to or reinforces the magnetic polarity of the permanent magnet 22 in a manner similar to arranging two like batteries in series correctly by connecting the anode of one to the cathode of the other, and the cathode of the former to the anode of the latter, doubling the net voltage between the unconnected anode and the unconnected cathode.

4. The magnetic flux in the left pole 62 of the armature 28 begins to be reduced in its magnitude, from its pre-energization latching level, while concurrently the magnetic flux in the right pole 64 of the armature 28 starts to build up from essentially zero. This reduces the attracting force at the left pole 62 of the armature 28 while simultaneously increasing the attracting force at the right pole 64 of the armature 28, effectively reducing the initial left pole 62 latching force or the force between the left pole 62 of the armature 28 and the left pole contacting member 66 when the left pole 62 is in contact with the left pole contacting member 66. In addition, the compressed spring 36 produces a force that pushes the armature 28 to the right so this force effectively reduces the initial latching force from the permanent magnet 22.

5. If there is essentially no load on the activating rod 48, the armature 28 will start to move toward the right pole contacting member 68 when the increasing attracting force on the right pole 64 of the armature 28 starts to exceed the reducing attracting force on the left pole 62 of the armature 28, creating a net force on the armature 28 in the right direction toward the right pole contacting member 68 that causes the armature 28 to move to the right. This initial movement "feeds on itself", and as an air gap A at the left pole 62 of the armature 28 forms and the air gap B at the right pole 64 of the armature 28 concurrently is reduced this encourages more flux to move the armature 28 to the right, further increasing the net right direction force on the armature 28, so the armature 28 literally snaps to the right pole bi-stable position with the right pole 64 of the armature 28 in contact with the right pole contacting member 68. The compressed spring 36 also exerts a force on the armature 28 that adds to this right direction electromagnetic force on the armature 28.

6. When there is a load on the activating rod 48 that resists motion of the armature 28 to the right, the armature 28 will start to move toward the right pole contacting member 68 when the increasing right pole 64 attracting force on the armature 28 exceeds the reducing left pole 62 attracting force and the resisting load on the activating rod 48. Assuming that the resisting load on the activating rod 48 either becomes less or remains essentially unchanged, the armature 28 snaps to the right pole bi-stable position with the right pole 64 of the armature 28 in contact with the right pole contacting member 68. When this occurs, the multi-force actuating valve 10 is in its closed position as illustrated in FIG. 4. In this position, the spring 42 has been compressed and the valve sealing surface portion 54 of the valve closure member 52 is in contact with the valve seat surface 56 and hence no fluid can flow through the multi-force actuating valve 10 since there is no open passage between the inlet and outlet ports 58 and 60.

7. The applied DC voltage is switched-off after the armature 28 snaps to the right pole bi-stable position with the right pole 64 of the armature 28 in contact with the right pole contacting member 68. Although the right pole latching force on the right pole 64 of the armature 28 is reduced slightly after de-energization of the coils 24 and 26, it is still substantial even though the spring 42 provides a force that acts against the latching force between the right pole 64 of the armature 28 and the right pole contacting member 68. The entire process described in the previous steps 1 through 6, usually takes only a few milliseconds.

Generally speaking, a fixed electrical pulse width on the order of 10 milliseconds is used to provide a 100% safety margin (e.g., the electrical pulse width exceeds the total actuation time of the multi-force actuator valve 10 by at least a factor of two). The energization process for the coils 24 and 26 to move the armature 28 back to the position with the left pole 62 of the armature 28 in contact with the left pole contacting member 66 is the reverse of the previously described process. This reverse process is initiated by applying an electrical polarity pulse that is the reverse of that used previously at the two coils 24 and 26, again typically a 28 volt pulse with a 10 millisecond electrical pulse width.

The permanent magnet 22 flux density remains essentially constant throughout the energizations. No electrical energy is wasted in demagnetizing and re-magnetizing the permanent magnet 22. In fact, unlike other electromagnetic actuation methods that must demagnetize and re-magnetize the permanent magnet, the more stable and de-magnetization-resistant permanent magnet material the better. Consequently, this multi-force actuator valve 10 has the important new ability to utilize the modern, powerful rare-earth permanent magnets made from materials such as the samarium cobalt (SmCo), neodymium-iron-boron (NeFeB), and bonded neodymium (bonded Ne).

From the previous description, it is important to realize that the compressed spring 36 does two very important things. First, it adds its force to act against the strong magnetic force that is applied from the permanent magnet 22 through the left pole contacting member 66 and the left pole 62 of the armature 28 that holds the left pole 62 of the armature 28 against the left pole contacting member 66 so that the resulting force tending to hold the armature 28 in contact with the left pole contacting member 66 is reduced. This means that less of an electromagnetic force is necessary to operate the multi-force actuator valve 10. This permits a smaller size valve that is very desirable for space and other such applications. It also reduces the power requirement for the valve that is also that is very desirable for space and other similar applications. Second, the force from the spring 36 gives the armature 28 a desirable acceleration which is added to the electromagnetic force acting on the armature 28 when electric current is applied to the coils 24 and 26. This provides for a more positive and more reliable operation of the armature 28 and valve closure.

To summarize, the previously described improved multi-force actuator valve 10 operates as a latching multi-force actuator valve and provides the following substantial actuation performance advantages:

1. The "separating" compressed mechanical spring forces from the springs 36 and 42 reduce the attracting magnetic forces at the end pole 62 and 64 of the armature 28, thereby reducing the net latching forces when the poles 62 and 64 are in contact with the respective pole contacting members 66 and 68.

2. When the coils 24 and 26 are energized to actuate the multi-force actuator valve 10, the compressed spring forces from the springs 36 and 42 supplement the actuator magnetic forces and increase the force output of the multi-force actuator valve 10 to overcome external loads. In other words, the end position spring forces from the springs 36 and 42 reduce the net latching forces and provide these reductions as increased actuation force during multi-force actuator valve 10 energization. This is a very beneficial and attractive latch force versus actuation force trade off since in many cases the end position latch forces created in the prior art actuator valves are well in excess to what are needed in most applications, whereas the limited energized actuation force capability of prior art actuator valves restricts their application to lower pressure and smaller flow capacity valve applications. Consequently, this tradeoff of decreasing latch force to increase energization force allows the new multi-force actuator valve 10 to be used for higher pressure and larger valves. This actuation efficiency improvement can also be used to reduce coil size and power since fewer coil "ampere-turns" are needed to actuate this improved multi-force actuator valve 10.

The previously described multi-force actuator valve 10 illustrated in FIGS. 1 through 4 can be converted to a modulating valve by using the modulating circuit that is designated generally by the number 90 and is illustrated in FIG. 2. As illustrated in FIG. 2, the modulating circuit 90 comprises a modulating power supply 92 that is well known in the art. The electrical outputs 94 and 96 of the modulating power supply 92 are electrically connected to the respective switches 98 and 100 that are in turn electrically connected to the respective electrically conductive leads 102 and 104 that are in turn electrically connected to the previously described electrically conductive leads 83 and 82. In order to use the multi-force actuator valve 10 as a modulating valve, the switches 74, 75, 76, and 77 of the H-bridge circuit 72 are opened or inactivated so that the H-bridge circuit 72 is turned off. Then, the switches 98 and 100 of the modulating circuit 90 are closed and this results in electrical current from the modulating power supply 92 being fed from the outputs 94 and 96, through the electrically connected respective switches 98 and 100 and through electrically connected respective electrically conductive leads 102 and 104 to the electrically connected leads 83 and 82. As previously indicated in connection with the H-bridge circuit 72, the electrically conductive leads 82 and 83 are electrically connected to the coils 24 and 26 that cause back and forth movement of the armature 28. Consequently, electrical current from the modulating power supply 92 that flows through the coils 24 and 26 in one direction will cause the armature 28 to move in the opposite direction and then when the electrical current is reversed, the armature 28 will move in the opposite direction. Since the electrical current supplied by the modulating power supply 92 is modulated, the movement of the armature 28 will be proportional to the current level in the coils 24 and 26 and as a consequence the position of the valve closure member 52 that is located between the input port 58 and one outlet port 60 in the valve housing 14 will vary to produce a variable output from the outlet port 60. The H-bridge circuit 72 and the modulating circuit 90 comprise electrical current control input means for supplying and controlling electrical current to the coils 24 and 26 for controlling the movable magnetically operated armature member 28. The switches 74, 75, 76, and 77 of the H-bridge circuit 72 and the switches 98 and 100 of the modulating circuit 90 comprise switching means for switching between the plurality of types of controls, including the H-bridge circuit 72 and the modulating circuit 90, for permitting the multi-force actuator valve invention 10 to be switched from one type of valve to another.

Figure 5:
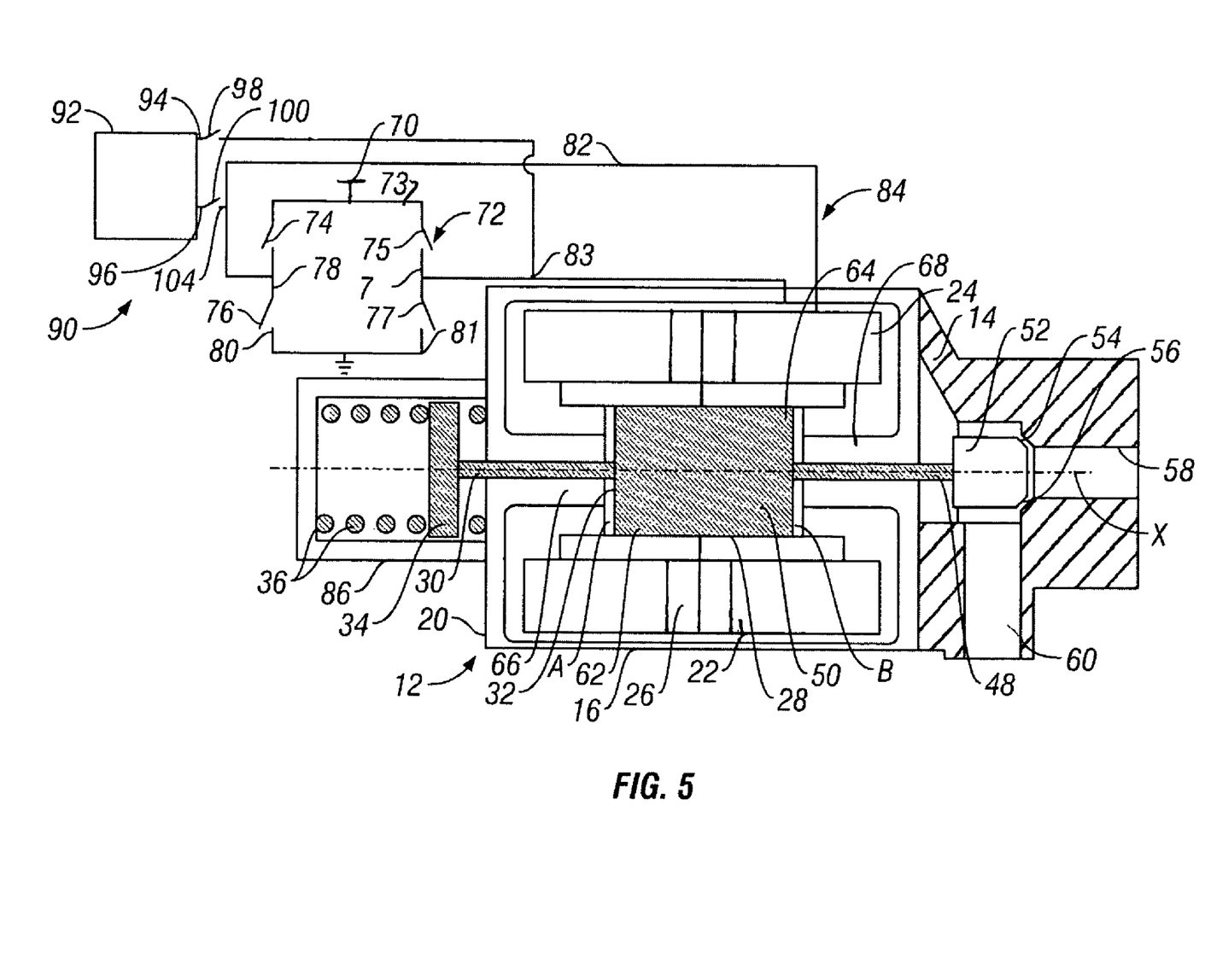
FIG. 5 is a sectional view of a second embodiment of the multi-force actuator valve invention illustrated in the valve open position and also illustrating the power sources and the electrical circuits used for valve operation.
Figure 6:
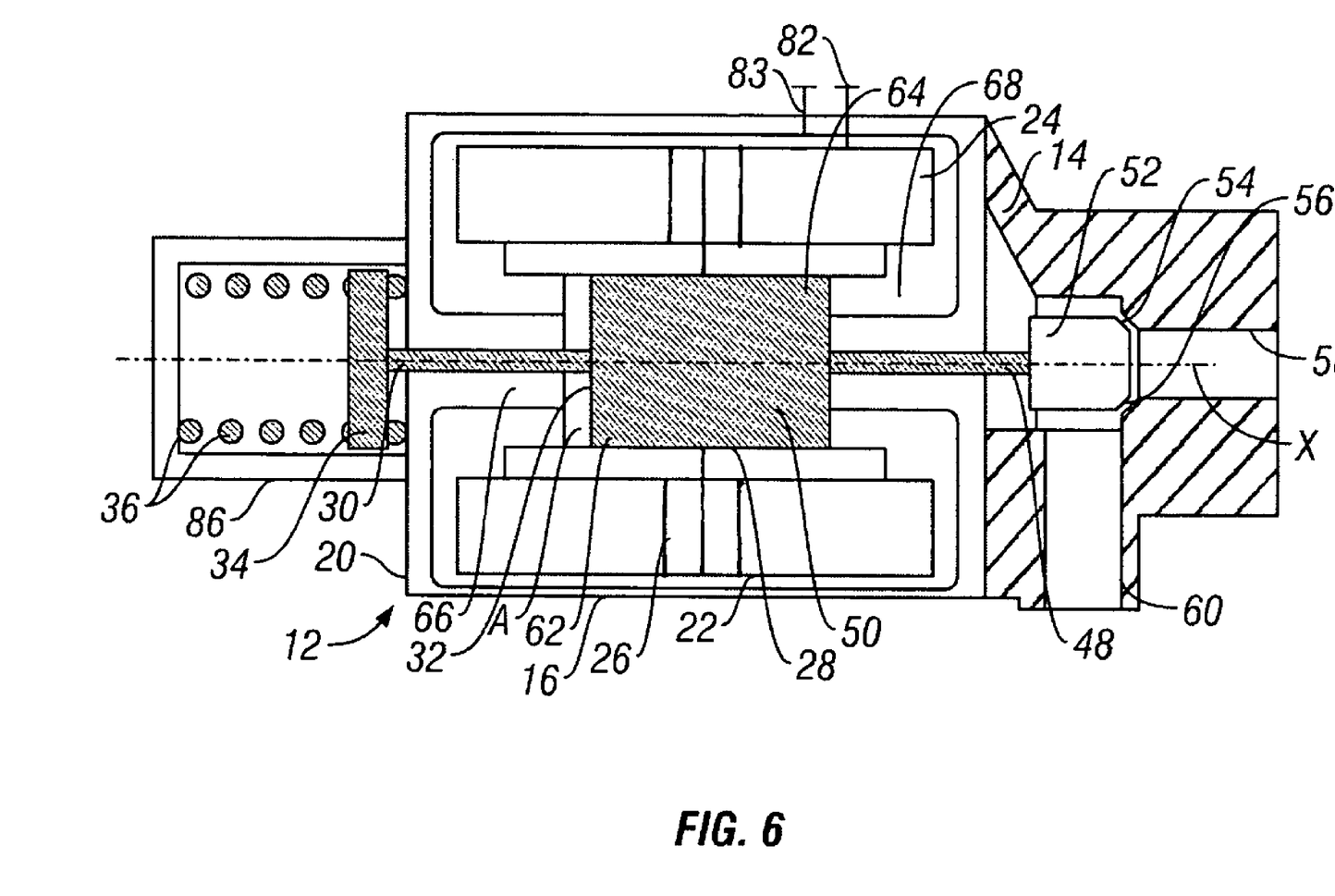
FIG. 6 is a sectional view of a second embodiment of the multi-force actuator valve invention illustrated in FIG. 5 in the valve closed position.

It is possible to use only one helical spring 36 or 42 in the multi-force actuator valve 10 which simplifies the design of the valve. FIGS. 5 and 6 set forth such a simplified valve that is designated generally by the number 84. FIG. 5 illustrates the multi-force actuator valve 84 in the valve open position and FIG. 6 illustrates the multi-force actuator valve 84 in the valve closed position. The multi-force actuator valve 84 has most of the same components as the previously described multi-force actuator valve 10 that is set forth in FIGS. 1 through 4.

As illustrated in FIGS. 5 and 6, the multi-force actuator valve 84 has the same a hollow actuator housing 12 that is connected to the hollow valve housing 14. The actuator housing 12 also has the hollow main housing 16. Also, the multi-force actuator 84 has the same donut shaped permanent type magnet 22 which is centrally located within the main housing 16 and the solenoid coils 24 and 26 that are located immediately adjacent to each side of the permanent magnet 22 as well as the cylindrically shaped armature 28 that is located within the permanent magnet 22 and the associated solenoid coils 24 and 26 and is free to move back and forth axially within the permanent magnet 22 and the associated solenoid coils 24 and 26.

The multi-force actuator valve 84 also has the same connecting rod 30 that is connected to one end 32 of the armature 28 and extends outward from the end 32 along the long axis X of the armature 28 with the outer end of the connecting rod 30 connected to the disc shaped force exerting member 34 and the cylindrical activating rod 48 that is connected to the other end 50 of the armature 28 and extends outward from the end 50 of the armature along the long axis X of the armature 28 to the valve closure member 52 that has a valve sealing surface portion 54. The multi-force actuator valve 84 also has the valve seat surface 56 that is located between the input port 58 and the outlet port 60 in the valve housing 14 and is located and shaped to receive the valve sealing surface portion 54 of the valve closure member 52.

However, the spring 42 is removed and the hollow mechanical force housing 18 of the multi-force actuator valve 10 has been replaced by a smaller hollow mechanical force housing 86 that is connected to one end 20 of the main housing 16. Since the spring 42 has been removed, a smaller hollow mechanical force housing 86 is needed. Consequently, basically the only changes that are required to convert the the multi-force actuator valve 10 into the the one spring multi-force actuator valve 84 are the removal of the spring 42 and the substitution of the smaller hollow mechanical force housing 86 for the hollow mechanical force housing 18.

This one spring multi-force actuator valve 84 is an asymmetric actuator valve, which works more powerfully as an actuator valve in one direction than in the other. It should be noted that the spring 36 has little or no installed force when the armature 28 is in the right pole 64 position with the right pole 64 of the armature 28 in contact with the right pole contacting member 68, so the full magnetic latching force exists in the right pole 64 position of the armature 28. It should be understood that the terms left and right refer to the multi-force activator valve 84 as it is set forth in FIGS. 5 and 6. When the coils 24 and 26 are momentarily electrically energized to move the armature 28 to the left, the spring 36 is compressed, providing a separating force on the armature 28 with the left pole 62 of the armature 28 in contact with the left pole contacting member 66, which reduces the latching force on the armature 28 with the left pole 62 of the armature 28 in contact with the left pole contacting member 66 in the latched position when the coils 24 and 26 are de-energized.

The subsequent operation of the multi-force actuator valve 84 from its left latched position with the valve closure member 52 open as illustrated in FIG. 5 to the position with he closure member 52 in its closed position in FIG. 6 is similar to that for the previously described two-spring multi-force actuator valve 10 except that there is no spring 42 that is compressed or provides any force. Consequently, there is no need to repeat the previous description of valve operation. It is important to note that since there is no spring 42, the right pole latching force on the right pole 64 of the armature 28, after de-energization of the coils 24 and 26, is larger than that if the spring 42 provided a force that acts against the latching force between the right pole 64 of the armature 28 and the right pole contacting member 68 as it does in the two-spring multi-force actuator valve 10 set forth in FIGS. 1 through 4.

The multi-force actuator valve 84 invention can be arranged to assume a normal-open end position as illustrated in FIG. 6 when power to the coils 24 and 26 is switched off (like in a normally-closed valve). This operating mode provides a fail safe position in the event electrical power fails. The multi-force actuator valve 84 embodiment shown in FIGS. 5 and 6 can be made electrically fail safe by increasing the force of the spring 36 so that the force exerted by the spring 36 exceeds the permanent magnet 22 force between the left pole 62 of the armature 28 and the left pole contacting member 66 when they are in contact. Or in terms of the previous equation:

$$F_t = F_{mech} + F_{mag} + F_{emag}$$

we add the further limitation $$F_{mech} > F_{mag}$$

when $$F_{emag} = 0$$

The previously described multi-force actuator valve 84 illustrated in FIGS. 5 and 6 can be converted to a modulating valve by using the previously described modulating circuit 90 that is illustrated in FIG. 5. As illustrated in FIG. 5, the electrical outputs 94 and 96 of the modulating power supply 92 are electrically connected to the respective switches 98 and 100 that are in turn electrically connected to the respective electrically conductive leads 102 and 104 that are in turn electrically connected to the previously described electrically conductive leads 83 and 82. In order to use the multi-force actuator valve 84 as a modulating valve, the switches 74, 75, 76, and 77 of the H-bridge circuit 72 are opened or inactivated so that the H-bridge circuit 72 is turned off. Then, the switches 98 and 100 of the modulating circuit 90 are closed and this results in electrical current from the modulating power supply 92 being fed from the outputs 94 and 96, through the electrically connected respective switches 98 and 100 and through electrically connected respective electrically conductive leads 102 and 104 to the electrically connected leads 83 and 82. As previously indicated, the electrically conductive leads 82 and 83 are electrically connected to the coils 24 and 26 that cause back and forth movement of the armature 28 and consequently electrical current from the modulating power supply 92 that flows through the coils 24 and 26 in one direction will cause the armature 28 to move in the opposite direction and then when the electrical current is reversed, the armature 28 will move in the opposite direction. Since the electrical current supplied by the modulating power supply 92 is modulated, the movement of the armature 28 will be proportional to the current level in the coils 24 and 26 and as a consequence the position of the valve closure member 52 that is located between the input port 58 and one outlet port 60 in the valve housing 14 will vary to produce a variable output from the outlet port 60.

As previously indicated for the multi-force actuator valve embodiment 10, the switches 74, 75, 76, and 77 of the H-bridge circuit 72 and the switches 98 and 100 of the modulating circuit 90 comprise switching means for switching between the plurality of types of controls, including the H-bridge circuit 72 and the modulating circuit 90, for permitting the multi-force actuator valve invention 84 to be switched from one type of valve to another.

The multi-force actuator valve embodiments 10 and 84 are made for standard materials known in the art using suitable manufacturing and assembly techniques known in the art. The springs 36 and 42 are conventional and the choice of the strength of the spring 36 and 42 or other such mechanical force exerting means will be known to those skilled in the art and will depend on the application for the multi-force actuator valve embodiments 10 and 84. The permanent magnet 22 is conventional and as previously indicated a modern rare-earth permanent magnet made 22 from materials such as the samarium cobalt (SmCo), neodymium-iron-boron (NeFeB), and bonded neodymium (bonded Ne) type permanent magnet 22 is preferred.

Although the invention has been described in considerable detail with reference to certain preferred embodiments, it will be understood that variations or modifications may be made within the spirit and scope of the invention as defined in the appended claims.

What is claimed is:

1. A multi-force actuator valve comprising:
   at least one radially polarized permanent magnet,
   at least one electromagnetic coil associated with the at least one radially polarized permanent magnet,
   a movable magnetically operated armature member,
   a valve operable by the armature member,
   a mechanical force exerting means positioned to exert a force on the movable magnetically operated armature member; and
   a switching means integrated with the multi-force actuator valve and operable to switch between at least two of a plurality of control types operating at least two valve types.

2. The multi-force actuator valve of claim 1 wherein the at least one radially polarized permanent magnet has an aperture and the movable magnetically operated armature member is located within said aperture.

3. The multi-force actuator valve of claim 1 wherein the at least one electromagnetic coil comprises a pair of associated electromagnetic coils.

4. The multi-force actuator valve of claim 3 further comprising electrical current supply means interconnected with the pair of associated electromagnetic coils.

5. The multi-force actuator valve of claim 4 wherein the electrical current supply means includes a control means controlling electrical current to the pair of associated electromagnetic coils.

6. The multi-force actuator valve of claim 4 wherein the electrical current supply means provides electrical current to the pair of associated electromagnetic coils thereby controlling movement of the movable magnetically operated armature member.

7. The multi-force actuator valve of claim 1 wherein the valve types include at least one of a latching valve and a modulating valve.

8. The multi-force actuator valve of claim 1 wherein the mechanical force exerting means includes at least one spring member.

* * * * *